UNITED STATES PATENT OFFICE.

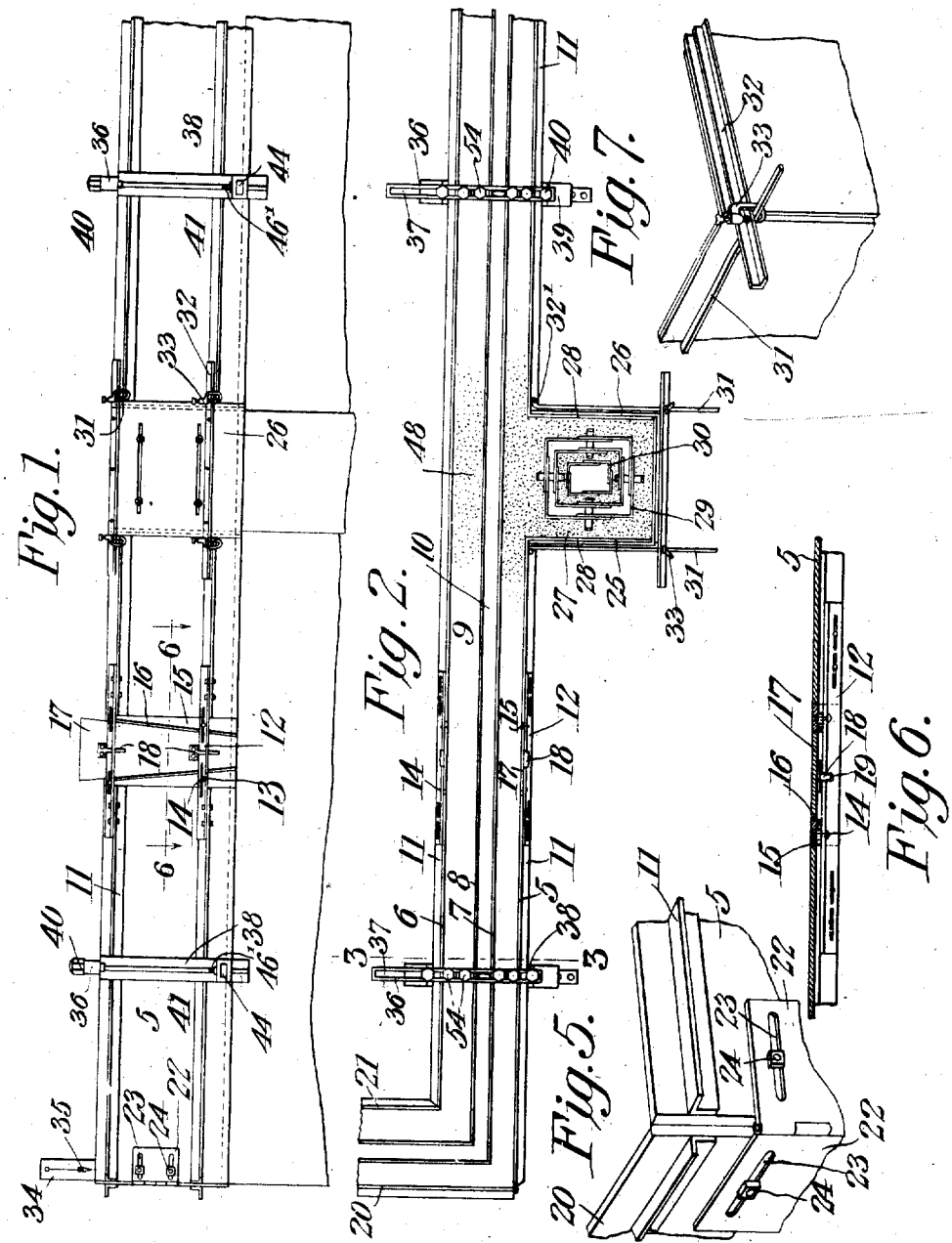

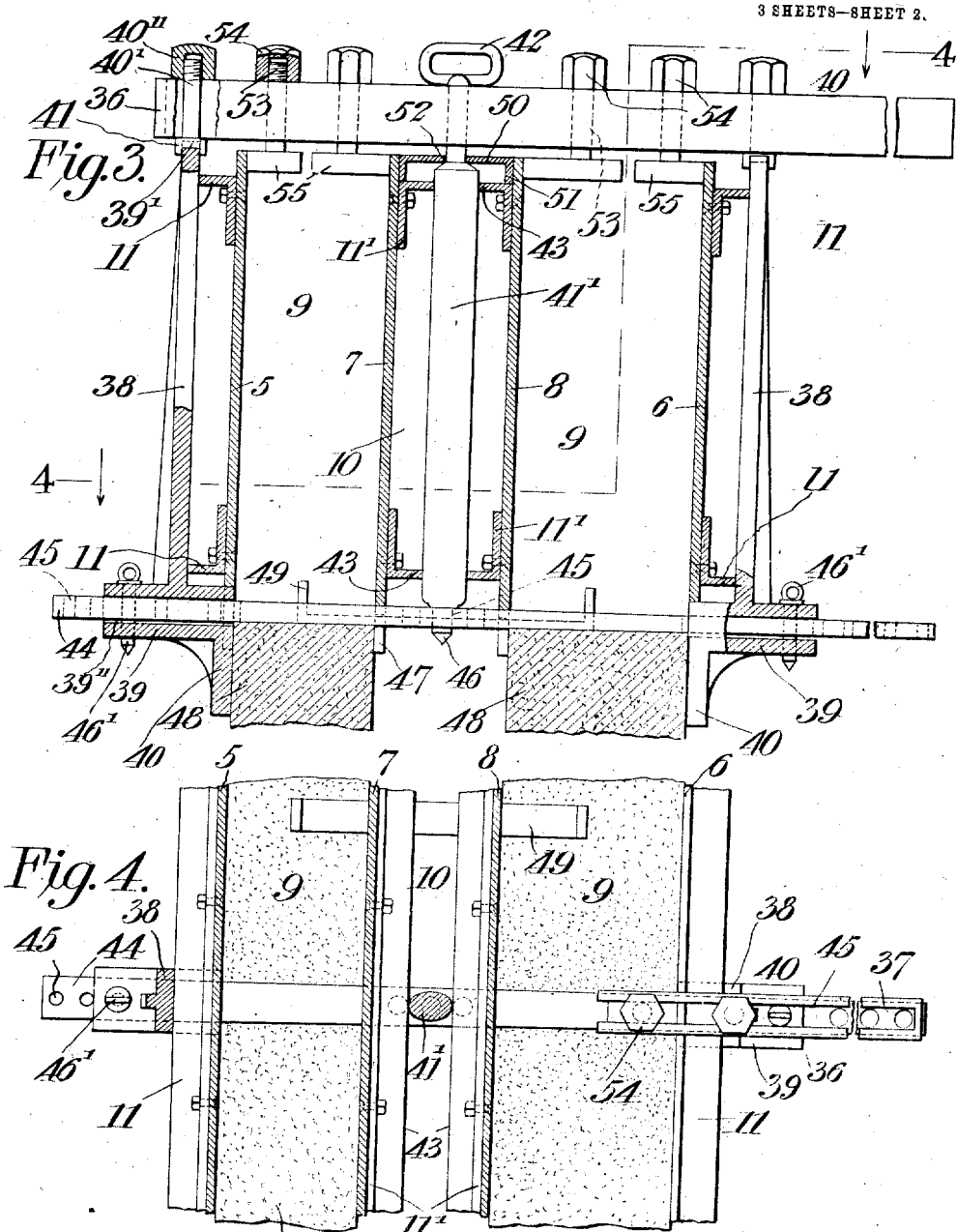

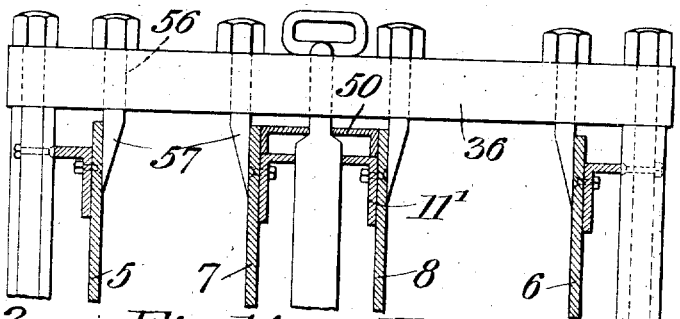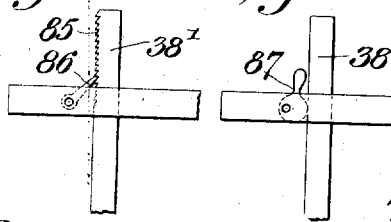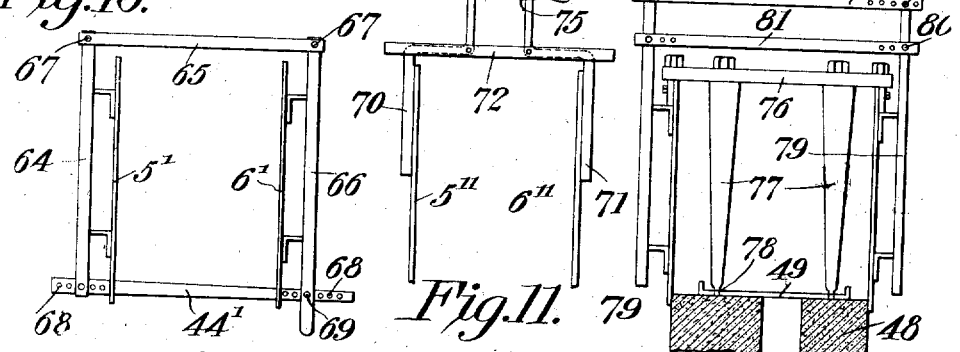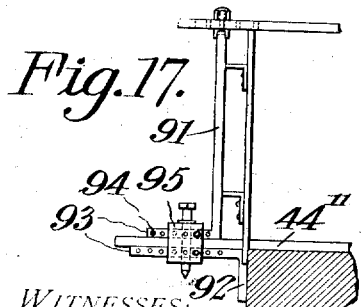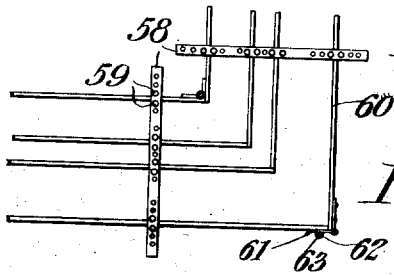

JACOB BREWER, OF HAZLETON, PENNSYLVANIA.

MACHINE FOR FORMING ARTIFICIAL-STONE WALLS.

No. 900,261.      Specification of Letters Patent.      Patented Oct. 6, 1908.

Application filed May 13, 1907. Serial No. 373,414.

*To all whom it may concern:*

Be it known that I, JACOB BREWER, a citizen of the United States, residing at Hazleton, in the county of Luzerne and State of Pennsylvania, have invented a new and useful Machine for Forming Artificial - Stone Walls, of which the following is a specification.

This invention relates to the construction of buildings and more particularly to a machine for molding walls, partitions and other portions of a building from cement, concrete and similar plastic material.

The object of the invention is to provide a strong, durable machine of the character specified including a plurality of detachable plates or mold sections spaced apart to form a molding chamber for the reception of the cement or other plastic material, and having combined therewith intermediate plates or mold sections for producing a chamber or air-space extending the entire height and length of the wall.

A further object of the invention is to provide means for clamping the several mold sections in position on the wall, and means for elevating the clamping means to inoperative position thereby to permit the removal of the mold sections.

A further object of the invention is to provide a wedge shaped supporting member for holding the mold sections and clamping members in position, and means carried by the clamping members for forming a seat or recess in the wall for the reception of said supporting members when the mold sections are adjusted vertically to permit the formation of an adjacent course in the wall.

A further object is to provide means for adjusting the end walls of the mold laterally, and means for forming chimneys, pillars, columns and the like.

A further object of the invention is to generally improve this class of machines so as to increase their utility, durability and efficiency.

Further objects and advantages will appear in the following description, and illustrated in the accompanying drawings, it being understood that various changes in form, proportions, and minor details of construction may be resorted to within the scope of the appended claims.

In the accompanying drawings forming a part of this specification: Figure 1 is a side elevation of a molding machine constructed in accordance with my invention showing the same in position on a portion of a cement wall. Fig. 2 is a top plan view of the same. Fig. 3 is an enlarged transverse sectional view taken on the line 3—3 of Fig. 2. Fig. 4 is a horizontal sectional view taken on the line 4—4 of Fig. 3. Fig. 5 is a detail perspective view of one end of the mold. Fig. 6 is a transverse sectional view taken on the line 6—6 of Fig. 1. Fig. 7 is a detail perspective view of the upper portion of the mold for forming the chimney. Fig. 8 is a transverse sectional view illustrating a modified form of the invention. Fig. 9 is a top plan view showing a different manner of adjusting the end walls of the mold. Fig. 10 is an end view illustrating a modified form of clamp for supporting the side walls of the mold. Fig. 11 is a similar view illustrating a further modified form of clamp. Fig. 12 is a transverse sectional view showing the manner of supporting the side plates in position on the wall without the use of the bottom bar. Figs. 13 to 17 inclusive are side elevations showing different ways of clamping the standards or uprights on the clamping members.

Similar numerals of reference indicate corresponding parts in all of the figures of the drawings.

The improved molding machine consists of the outer plates or mold sections 5 and 6, and the inner plate or sections 7 and 8, said plates being constructed of wood, metal or other suitable material and made in suitable lengths so as to permit the same to be conveniently handled.

The outer and inner plates are spaced apart to form molding chambers 9 for the reception of cement, concrete, or other plastic material, the plates 7 and 8 being also spaced apart so as to form an intermediate air chamber 10 preferably extending throughout the entire height and length of the wall, as shown. The outer mold sections 5 and 6 are reinforced by spaced longitudinal angle irons 11 to which are secured connecting bars 12 having elongated slots 13 formed therein for the reception of bolts, or other suitable fastening devices 14.

Secured to the connecting bars 12 by means of the bolts 14 and bearing against the adjacent vertical edges of the outer mold sections are inclined blocks 15 provided with lateral guide flanges 16 and between which is inserted a wedge or connecting strip 17, the latter being provided with depending hooks 18 which engage suitable openings 19 formed in the flanges of the connecting bars 12, as shown.

Associated with the outer mold sections 5 and 6 are laterally adjustable end sections or walls 20 and 21 to which are secured suitable hinged plates 22 having elongated slots 23 formed therein for the reception of bolts, or suitable fastening devices 24 whereby the end sections or walls of the mold may be swung laterally and locked in adjusted position to permit the formation of angular corners.

As a means for forming the chimney of the wall there is provided a plurality of over-lapping angularly disposed mold sections 25 and 26 extending laterally from the outer mold section 5 and forming a molding chamber 27 which communicates with the molding chamber 9, as shown, there being suitable plates 28 bearing against the angular mold sections so as to permit said sections to be adjusted laterally without allowing the cement or concrete to escape from the molding compartment.

When it is desired to form the walls of the chimney with a vertical air-space to prevent over-heating of the same, suitable auxiliary mold sections 29 are embedded in the walls of the chimney and likewise a central core 30 for forming the chimney flue, these parts being detached or removed in the usual manner after the cement or concrete has set. The angular mold sections 25 and 26 are clamped in assembled position by means of suitable rods 31 pivoted at 32′ of the outer mold section 5, and connecting the free ends of said rod is an angular bar 32 adjustably secured to the rod 31 by suitable clamps 33.

In order to aline the several mold sections with the finished portion of the wall one of said sections is provided with an arm 34 from which is suspended a plumb-bob 35 so that the operator may see at a glance if the wall is out of alinement and quickly rectify the same. The several mold sections are retained in position on the wall by means of a clamping member or bar 36 which extends transversely across the wall and is provided with an elongated slot 37, as shown.

Arranged below the bar or clamping member 36 are oppositely disposed rods or standards 38 provided with lateral enlargements 39 defining depending brackets or supports 40 which bear against the exterior faces of the finished wall and serve to support the side plates 5 and 6, as best shown in Fig. 3 of the drawing. The upper ends of the standards 38 are secured to the clamping bars 36 by means of bolts 40′ the threaded ends of which pass through the slots 37 for engagement with clamping nuts 40″ while the opposite ends of said bolts are seated in suitable recesses or notches 39′ formed in the adjacent ends of the standards 38 and are provided with spaced flanges 41 which bear against the side walls of the standards as shown, and thus serve to prevent lateral movement of the same.

The standards 38 are adjustable longitudinally of the clamping member or bar 36 thereby to adapt the device for forming walls of different thicknesses, said standards being locked in adjusted position by means of the clamping nuts 40″. The inner mold sections or plates 7 and 8 are also provided with longitudinal reinforcing flanges or angle bars 11′ and disposed between said flanges and carried by the bar 36 is a combined locking key and elevating member 41′. The locking and elevating member 41′ is provided with an operating handle 42 and is preferably substantially elliptical in cross-section, as best illustrated in Fig. 4 of the drawings so that by rotating the handle 42 the sides of the member 41′ will bear against the inwardly extending flanges 43 of the bars 11′ and thus force the inner mold sections or plates laterally in engagement with the adjacent sides of the wall.

The enlargements 39 of the standards are formed with alined openings 39″ for the reception of a supporting member 44 which extends transversely across the wall and is preferably wedge shaped, as shown, said member or bar being provided with a plurality of spaced openings or perforations 45 for the reception of the reduced end 46 of the elevating member 41′, and also for the reception of suitable pins or bolts 46′ which pass through alined openings in the enlargements 39 and thereby prevents accidental displacement of the member 41′ and the standards 38 during the molding operation.

The lower edges of the inner and outer mold sections or plates are provided with recesses or notches 47 adapted to receive the supporting member 44, and extending transversely across the air-chamber or space 10 and embedded in the wall 48 are suitable tie-members 49, said members being locked in position by engagement with the lower edges of the inner mold sections, as best illustrated in Fig. 3 of the drawings.

As a means for preventing the cement, concrete or other plastic material from entering the air-chamber 10 while filling the molding compartments, there is provided a suitable cap 50 the depending flanges 51 of which bear against the flanges 43 of the angle bars 11′ so that the top of the cap will be disposed flush with the adjacent ends of the inner mold sections 7 and 8, there being a suitable opening 52 formed in the cap 50 to permit the passage of the reduced neck of the operating member 41′.

Slidably mounted for longitudinal movement in the slot 37 of the clamping member 36 are a plurality of bolts 53 each having one end thereof threaded for engagement with a suitable clamping nut 54 and provided at its opposite end with a block or angular arm 55 adapted to bear against an adjacent mold section and prevent tilting movement of the same. The blocks 55 are preferably wedge shaped and disposed in horizontal alinement so as to form a transverse recess or seat in the wall for the reception of the supporting member 44 when the mold sections are adjusted vertically on the wall to permit the formation of a succeeding course in the said wall. By having the supporting member 44 substantially wedge shaped, as shown, the same may be readily removed from the wall without danger of cracking or otherwise injuring the cement or other plastic material forming the same.

In constructing the wall the supporting members 44 are seated in the grooves formed by the blocks 55 in the upper face of the completed wall section and the inner and outer mold sections placed in position on the wall, as best shown in Fig. 3 of the drawings, after which the clamping member is extended transversely across the top of the mold sections and the standard 38 adjusted longitudinally in engagement with the flanges 11 and fastened by the pin 46' and the bolts 40', in the manner before stated. The blocks 55 are then adjusted longitudinally of the clamping member and forced laterally into engagement with the inner walls of the mold sections, thus securing the latter in alinement with the completed section. After the several parts have been thus adjusted the handle 42 is rotated which causes the locking key 41' to bear against the flanges 43 and press the adjacent mold sections laterally against the inner faces of the wall at the central air-chamber. The cement, concrete and other plastic material is then shoveled or otherwise introduced into the molding compartment between the inner and outer wall sections and thoroughly tamped in any suitable manner. Attention is here called to the fact that the cap 50 forms a closure for the air-chamber while the nuts 40'' and 54 form housings for the upper ends of the bolts 40' and 53 thus protecting said bolts from the cement while the mold is being filled. After the cement has thoroughly set, the handle 42 is rotated in the opposite direction which releases the inner mold sections 7 and 8. An upward pull is then exerted on said handle thus lifting the clamping member, carrying the standards 38 and spacing blocks 55 so as to permit the removal of the several mold sections. In order to form a succeeding course the tie-rods 49 are placed across the air-chamber at the top of the completed wall section and embedded in the cement after which the supporting member 44 is placed in the seat or grooves formed by the blocks 55 and the several mold sections adjusted on the wall and secured in position by the clamping member, in the manner before described.

In Fig. 8 of the drawings there is illustrated a modified form of the invention in which the blocks or arms 55 are dispensed with, the bolts 56 being provided with flattening extensions 57 which bear against the interior walls of the mold sections, as shown.

In Fig. 9 of the drawings the several mold sections or plates are supported in spaced relation by transverse bars 58 provided with vertically disposed pins 59 which bear against the opposite side walls of the mold sections and thus prevent accidental displacement of the same. In this form of the device the pivoted end walls 60 are locked in adjusted position by a suitable hasp 61 which engages a staple or eye 62, there being a locking rod or pin 63 threaded through the staple 62 for retaining the adjacent outer mold section and end wall in adjusted position.

In Fig. 10 there is illustrated a modified form of clamping member, the latter being preferably constructed in three sections 64, 65 and 66 pivoted together as indicated at 67. In this form of the device the wedge shaped supporting bar 44' is provided with a plurality of transverse openings 68 at each end thereof, the lower end of the bar 64 being pivotally secured to the adjacent end of the supporting member while the lower end of the bar 66 is clamped to the opposite end of the bar 44' in any suitable manner, as by a bolt 69. In releasing the side sections 5' and 6' of the mold the bolt 69 may be detached and the lever 66 swung upwardly and rearwardly which releases the side mold sections thereby permitting the same to be readily detached.

In Fig. 11 the clamping members 70 and 71 are pivotally secured to the supporting member 72 and provided with angularly disposed arms 73 to one of which is pivotally connected an operating handle 74 provided with a roller 75 whereby when the free end of the handle is depressed the roller will engage the adjacent arm 73 and force the clamping members in engagement with the mold sections 5'' and 6''.

As a means for retaining the tie-rods 49 and side plates 5 and 6 in position on the wall during the formation of a succeeding course without the employment of the supporting bar 44, the structure shown in Fig. 12 is employed in which the clamping member 76 is provided with a pair of depending arms 77 the terminals of which are reduced and engage suitable openings 78 formed in the tie-rod, as shown. In this form of the device the side sections of the mold are clamped in engagement with the wall by means of vertical rods or standards 79 pivotally connected at 80 to a transverse bar 81 and having their upper ends secured to a similar bar 82 disposed in spaced relation with the bar 81 and provided with a plurality of openings 83 whereby the standard 79 may be tilted laterally on the pivotal points 80 and locked in tilted position by suitable clamping bolts 84 engaging the upper ends of the standard 79 and passing through the openings 83, as shown.

In Fig. 13 the standard 38' is provided with teeth or serrations 85 for engagement with a suitable pawl 86 for clamping said standard in engagement with the adjacent outer section of the mold, while in Fig. 14 a cam 87 is employed for a similar purpose.

In Fig. 15 a wedge shaped block or key 88 is interposed between the closed end of the clamping member and the adjacent face of the standard thereby to force the standard in engagement with the adjacent mold-section, the standard 38'' being secured in adjusted position on the member by a bolt 89 passing through one of a plurality of openings 90 formed in the clamping member in the form of the device, shown in Fig. 16 of the drawings.

A further modification is illustrated in Fig. 17 of the drawings in which the standards are formed in two sections 91 and 92 each provided with a laterally extending arm 93 between which is mounted for sliding movement the wedge shaped supporting member 44''. The extensions 93 are provided with transverse perforations 94 and are embraced by a sleeve or collar 95 also provided with perforations, as shown, so that by moving the extensions laterally and passing suitable bolts through said perforations the standards may be adjusted to fit walls of different thicknesses.

From the foregoing description it is thought that the construction and operation of the device will be readily understood by those skilled in the art and further description thereof is deemed unnecessary.

Having thus described the invention what is claimed is:

1. A molding machine including adjustable side sections, intermediate sections spaced from the side sections, a clamping bar extending transversely across said sections, standards depending from the clamping bar and adapted to engage the side sections, an adjustable block carried by the clamping bar and interposed between the side and intermediate sections, and a locking key bearing against the intermediate sections.

2. A molding machine including adjustable side sections, intermediate sections spaced from the side sections, a slotted clamping bar extending transversely across said sections, standards depending from the clamping bar and slidably mounted for longitudinal movement therein for engagement with the adjacent outer mold sections, a cap interposed between the intermediate sections, and a locking key bearing against the walls of said intermediate sections.

3. A molding machine including adjustable side sections, intermediate sections spaced from the side sections, a clamping bar extending transversely across the sections and provided with an elongated slot, standards bearing against the side sections, threaded bolts passing through the slots in the bar and provided with depending flanges engaging the standards, clamping nuts engaging the threads on said bolts, adjustable plugs bearing against the interior walls of the side and intermediate sections, respectively, and a locking key for exerting lateral pressure on the interior walls of the intermediate sections.

4. A molding machine including a wedge shaped supporting bar, adjustable side and intermediate sections bearing against said bar, a clamping member extending transversely across the top of said mold sections, standards depending from the clamping member and adapted to engage the walls of the side sections, and means carried by said clamping member for engagement with the interior walls of the side and intermediate mold sections.

5. A molding machine including a supporting member provided with spaced perforations, adjustable side and intermediate sections resting on the supporting member, a clamping bar extending transversely across the top of said sections, standards depending from the clamping bar and bearing against the side sections, means for locking the standards in engagement with the supporting member, and means carried by the clamping member for exerting lateral pressure on the interior walls of the side and intermediate sections.

6. A molding machine including a wedge shaped supporting member provided with spaced perforations, adjustable side and intermediate sections resting on said supporting member, a clamping bar extended transversely across the top of said sections and provided with an elongated slot, standards adjustable longitudinally of the clamping bar and provided with lateral enlargements having alined slots formed therein for the reception of the supporting member, threaded bolts slidably mounted in the said elongated slot of the clamping bar and provided with terminal plugs engaging the interior walls of the side and intermediate mold sections, nuts engaging the threaded ends of the bolts for locking the latter in adjusted position.

7. A molding machine including adjustable side and intermediate mold sections provided with longitudinally disposed angle bars, a clamping member extending transversely across the top of the mold sections, standards depending from the clamping bar and adapted to bear against the angle bars of the side mold sections, a cap interposed between the intermediate mold sections, and a locking key adapted to bear against the longitudinal bars of the intermediate mold sections for clamping the latter in adjusted position.

8. A molding machine including side sections provided with longitudinal angle irons, and having their adjacent ends inclined, a bar connecting the angle irons of adjacent sections, a wedge interposed between the inclined faces of said sections, and means carried by the wedge for engagement with the connecting bar.

9. A molding machine including side sections provided with longitudinally disposed angle bars and having their adjacent ends inclined, bars connecting the inclined ends of adjacent sections and having perforations formed therein, and a wedge bearing against said inclined faces and provided with depending hooks engaging the perforations in the connecting bars.

10. A molding machine including spaced side sections, angularly disposed plates associated therewith and having their adjacent ends over-lapped, clamping bars pivotally connected to the side sections and engaging the exterior walls of the angular plates, a transverse rod connecting the clamping bars, and means for connecting the clamping bars and transverse rod.

11. A molding machine including adjustable side sections, intermediate sections spaced from the side sections, a clamping member extending across the top of said sections and provided with an elongated slot, standards bearing against the side sections and provided with lateral enlargements defining depending brackets, there being alined openings formed in the enlargements the walls of which are perforated, a removable wedge shaped supporting member seated in openings in the enlargements and provided with spaced perforations, locking pins engaging the perforations in the enlargements and supporting member, respectively, and bolts slidably mounted in the slot of the clamping member and provided with terminal plugs engaging the interior walls of the side and intermediate mold sections.

In testimony that I claim the foregoing as my own, I have hereto affixed my signature in the presence of two witnesses.

JACOB BREWER.

Witnesses:
W. L. DEMANE,
CHARLES WETTERAN.